United States Patent
Bergmann et al.

(10) Patent No.: US 8,868,960 B2
(45) Date of Patent: Oct. 21, 2014

(54) SYNCHRONOUS CLOCK STOP IN A MULTI NODAL COMPUTER SYSTEM

(75) Inventors: Tobias Bergmann, Boeblingen (DE); Ralf Ludewig, Boeblingen (DE); Tobias Webel, Boeblingen (DE); Ulrich Weiss, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 13/170,466

(22) Filed: Jun. 28, 2011

(65) Prior Publication Data

US 2012/0005516 A1 Jan. 5, 2012

(30) Foreign Application Priority Data

Jul. 2, 2010 (EP) .................................... 10168216

(51) Int. Cl.
*G06F 1/04* (2006.01)
*G06F 1/12* (2006.01)
*G06F 15/16* (2006.01)
*G06F 1/32* (2006.01)

(52) U.S. Cl.
CPC ............... *G06F 1/12* (2013.01); *Y02B 60/1221* (2013.01); *G06F 1/3237* (2013.01)
USPC ............................ 713/375; 713/400; 713/401

(58) Field of Classification Search
CPC ............ G06F 11/0706; G06F 11/0793; H04L 7/0008; H04L 7/0016; H04L 7/0033
USPC ...................... 713/375, 400, 401; 710/61, 110
See application file for complete search history.

(56) References Cited

U.S. PATENT DOCUMENTS

| | | | |
|---|---|---|---|
| 7,484,118 B2 | 1/2009 | Rebmann et al. | |
| 8,140,925 B2 * | 3/2012 | Bellofatto et al. | 714/731 |

OTHER PUBLICATIONS

IBM Technical Disclosure Bulletin, "Synchronous Start/Stop in a Multi Nodal System", IPCOM000016108D (Jul. 12, 2002).

* cited by examiner

*Primary Examiner* — Jaweed A Abbaszadeh
(74) *Attorney, Agent, or Firm* — Steven Chiu, Esq.; Kevin P. Radigan, Esq.; Heslin Rothenberg Farley & Mesiti P.C.

(57) ABSTRACT

A computer system is provided which includes a plurality of nodes, which include chips of different types. In each node, one of the chips is configured as a master chip, which is connected to one or more slave chips via two or more multi-drop nets (e.g., checkstop, clockrun). The master chip and the slave chips are connected to a reference clock, and event triggering information is transmitted via the multi-drop nets (checkstop, clockrun) to the slave chips. Event trigger commands are submitted by the master chip when it receives a request, and internal offset counters are used to adjust both the receiving cycle and the cycle when the command is propagated to the units on the chips. In operation, the offset counters are synchronized by a reference clock.

12 Claims, 4 Drawing Sheets

SYNCHRONOUS CLOCK STOP IN A MULTI NODAL COMPUTER SYSTEM

PRIOR FOREIGN APPLICATION

This application claims priority from European Patent Application No. 10168216.9, filed Jul. 2, 2010, which is hereby incorporated herein by reference in its entirety.

BACKGROUND

The present invention relates generally to a multi nodal computer system comprising a number of nodes on which chips of different types reside.

An example for such multi nodal computer system is described in U.S. Letters Patent No. 7,484,118 B2. This system comprises a clock chip per node, which is the gate for a service interface into the system. The service interface comprises a service element, which sends commands to the clock chip and the clock chip provides the status of the node to the service element. The clock chip controls only the chips residing on its node, and the chips are appropriate for sending a check stop request to the associated clock chip in case of a malfunction. Depending on the source of the check stop request, either a system check stop, a node check stop, or a chip check stop is then performed.

These check stops stop either all chips in the systems, or only some chips on the affected node. The stopping of the respective chips needs to be performed synchronously in order to be able to analyze the cause of the malfunction. The IBM Technical Bulletin publication entitled "Synchronous Start/Stop in a Multi Nodal System", IPCOM000161108D, (Jul. 12, 2002), describes also a method to synchronously start all chips in a multi nodal system, while the different chips are connected to different clock chips and each clock chip to a different node controller.

For multi nodal computer systems that do not have a clock chip per node, a solution is needed that can start and stop all chips on a node synchronously. This solution must also be able to start and stop the different units on chip at the same clock cycle.

BRIEF SUMMARY

According to one embodiment of the present invention, a method for synchronously stopping and starting units on chips of a computer system is proposed, wherein the computer system comprises a plurality of nodes each of which includes chips of different types, wherein one of the chips is configured as a master chip, the master chip being connected to slave chips via at least two multi-drop nets, and wherein the master chip and the slave chips are connected to a reference clock. The method includes: in response to a request from one of the chips to trigger events in the units received by the master chip, sending, by the master chip, a respective command to itself and to all connected slave chips at the next pulse of the reference clock; and in response to a command received from the master chip, waiting, by the receiving chip, a defined number of clock cycles following the next pulse of the reference clock and subsequently triggering events in its units depending on the received command.

According to another embodiment of the present invention, a computer system is provided, which includes a plurality of nodes, which include chips of different types, wherein one of the chips is configured as a master chip, the master chip being connected to slave chips via at least two multi-drop nets, and wherein the master chip and the slave chips are connected to a reference clock. The master chip includes means to receive requests from the chips to trigger events in the units; and a command unit responsive to a received request and to a pulse from the reference clock to send a command according to the received request to the master chip and to all connected slave chips. The chips include command receiving means to receive a command from the master chip and to synchronize with the reference clock, a delay unit to wait for a defined number of clock cycles, and means to trigger events in the units on the chip.

In some of the embodiments, the events are clock stop or clock start actions of the respective chips.

DETAILED DESCRIPTION

Figure 1:
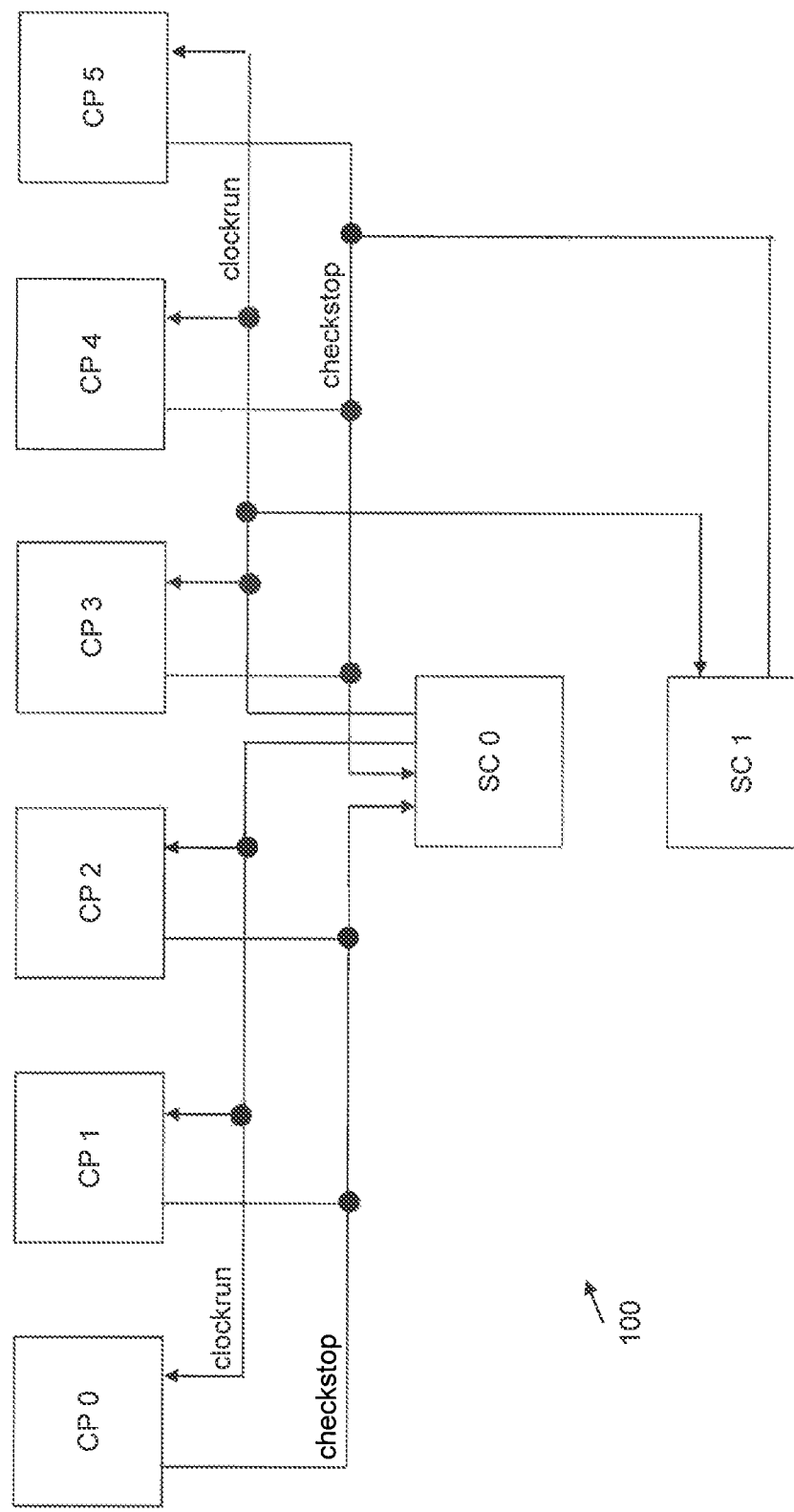
FIG. 1 is a block diagram illustrating chips of a node in a multi nodal computer system, in accordance with one or more aspects of the present invention.

FIG. 1 shows chips in a node of a multi nodal computer system 100. As illustrated, compute chips CP 0, CP 1, . . . , CP 5 are connected to cache chips SC 0 and SC 1. A clock chip is not available in the computer system 100. Each chip has an internal offset counter that is synchronized by a low frequency synchronization pulse. This counter is used to adjust the time for receiving inputs and propagating clock start and clock stop events. In one embodiment, the low frequency synchronization pulse has a frequency of 200 MHz, which is significantly lower than the clock frequency of the chips (which may be in the area of multiple GHz (for example 5.2 GHz)). In accordance with one or more aspects of the present invention, advantages are achieved by connecting the chips via multi-drop nets and distributing clock start requests and clock stop requests via the same multi-drop connection to all chips. The minimum configuration is one checkstop net and one clockrun net.

In each node of the computer system, one of the chips is configured to be the master chip, while the other chips are configured to be the slave chips for this master chip. The master chip reacts to any checkstop request and issues the start and stop commands to all chips. In order to increase system redundancy, all chips can comprise logic means to operate as either master chip or slave chip. In one embodiment, the cache chip SC 0 is configured as the master chip. The master chip and the slave chips use internal offset counters to adjust both the receiving cycle and the cycle when a command is propagated to the units on the chip. This allows for a high level of tolerance against latency differences on the multi-drop connection. In one implementation, the offset counters are synchronized by reusing a low frequency synchronization pulse already present in the computer system for other reasons.

A synchronous stop works as follows: When the computer system is in a running state and one chip raises a system check stop this gets propagated via a multi-drop net to the chip that has been configured as the master chip. The master chip issues a stop command, which is coded as a rising edge on a second multi-drop net and all slave chips receive this command at different points in time. In order to adjust for different wire delays each chip's receiving cycle can be configured individually. After a synchronous clock stop has occurred, the synchronous start command can be generated after an arbitrary number of cycles. So after debug information has been read from the failing chip and the computer system is again configured for operation, then the clock start is initiated by releasing the checkstop net.

Each chip can set a special configuration bit ("handbrake" bit) that will prevent the start from happening. The chips can be set up to a startable state, and each chip drops its handbrake whenever the local configuration is done. When the last handbrake gets released, the start process is initiated and the master sends the falling edge to all chips which then start all units at the same clock cycle of the internal high frequency clock.

The checkstop net is used to send check stop requests from the slave chips to the master chip. The clockrun net is used to send clock start commands from the master chip to the slave chips. For timing considerations more connections can be used, e.g., redundant point-to-point connections. For less reliable connections additional nets can be used: The configuration shown in FIG. 1 comprises two nets of each type. The master chip offers a configuration setting that can disable input nets if they are faulty. The checkstop net is used to distribute the start and stop requests, where a rising edge encodes a stop request and a falling edge a start request.

Figure 2:
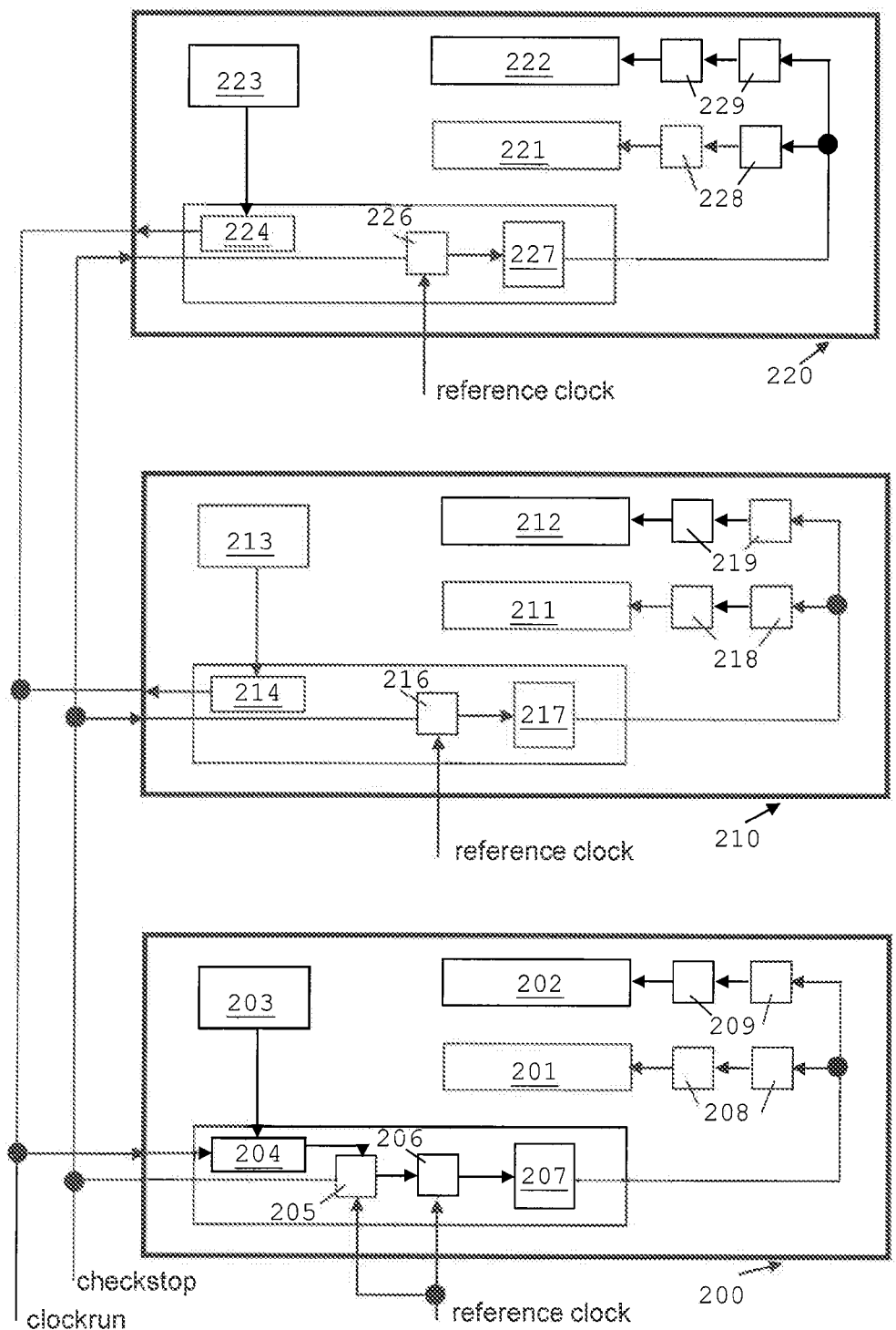
FIG. 2 is a block diagram illustrating a master chip and two slave chips, in accordance with one or more aspects of the present invention.

FIG. 2 shows embodiments of a master chip 200 and two slave chips 210, 220 in accordance with one or more aspects of the present invention. These chips comprise two units each. The master chip 200 comprises units 201 and 202. Slave chip 210 comprises units 211 and 212. Slave chip 220 comprises units 221 and 222. The chips further comprise a failure indication register, which are used by chip internal test means to store failure codes: The master chip 200 comprises failure indication register 203, the slave chip 210 comprises failure indication register 213, and the slave chip 220 comprises failure indication register 223. The chips comprise also a mask unit, which can mask the content of the failure register: The master chip comprises mask unit 204, the slave chip 210 comprises mask unit 214, and the slave chip 220 comprises mask unit 224. The mask units 204, 214, 224 are connected to the checkstop net. When a check stop is signalled in the failure indication registers 213 and 223 this will be forwarded as a check stop request via the checkstop net to the master chip 200 in case it was not masked by the mask units 214 or 224.

The mask unit 204 will then forward the check stop request to a latch 205, which is connected to a reference clock and its output is connected to the clockrun net. The reference clock delivers the low frequency synchronization pulse. The clockrun net is connected to a latch 216 and 226 in the slaves 210 and 220, respectively. The latches 216 and 226 are connected to the reference clock. The output of the latch 205 is also connected to a latch 206 in the master chip 200. Also the latch 206 is connected to the reference clock.

The latches 206, 216, and 226 are connected to variable delay units 207, 217, and 227, respectively. The variable delay units can be configured to a specific delay value. In one embodiment, the delay value can be configured during normal operation of the computer system by changing four mode bits. For example, the delay value can be a certain number of clock cycles of a system nest, in which the chips are embedded, in relation to the reference clock. When a clock stop request/command arrives at a delay unit, the clock stop request/command is delayed for the number of clock cycles defined by the delay value by using staging latches before it arrives at units of the chips. This way, a balanced staging achieves a compensation for any latency between the arrivals of the clock stop requests/commands at a chip such that the clock stop request arrives at the units 201, 202, 211, 212, 221, 222 simultaneously. For the master chip there is no latency as the latch 205 and 206 can be directly connected inside the same logic block. The master chip 200 uses the staging latches 208 for the unit 201 and the staging latches 209 for the unit 202. The slave chip 210 uses the staging latches 218 for the unit 211 and the staging latches 219 for the unit 212. The slave chip 220 uses the staging latches 228 for the unit 221 and the staging latches 229 for the unit 222. The staging latches 208, 209, 218, 219, 228, 229 have all the same depth of staging such that a synchronous arrival of the requests at the units 201, 202, 211, 212, 221, 222 is achieved.

The specific delay values can be determined during the development of the chips by a logic designer semi-automatically by using computer program, which models the synchronous clock stop/start behaviour. Starting with an initial value, the delay values are increased by the computer program until the synchronous clock stop/start is performed correctly. The computer program is used by the logic designer for various computer system clock frequency values. The logic designer will then choose a set of delay values delivered by the computer program which covers the clock frequency ranges of the computer system, which are used for its normal operation.

Figure 3:
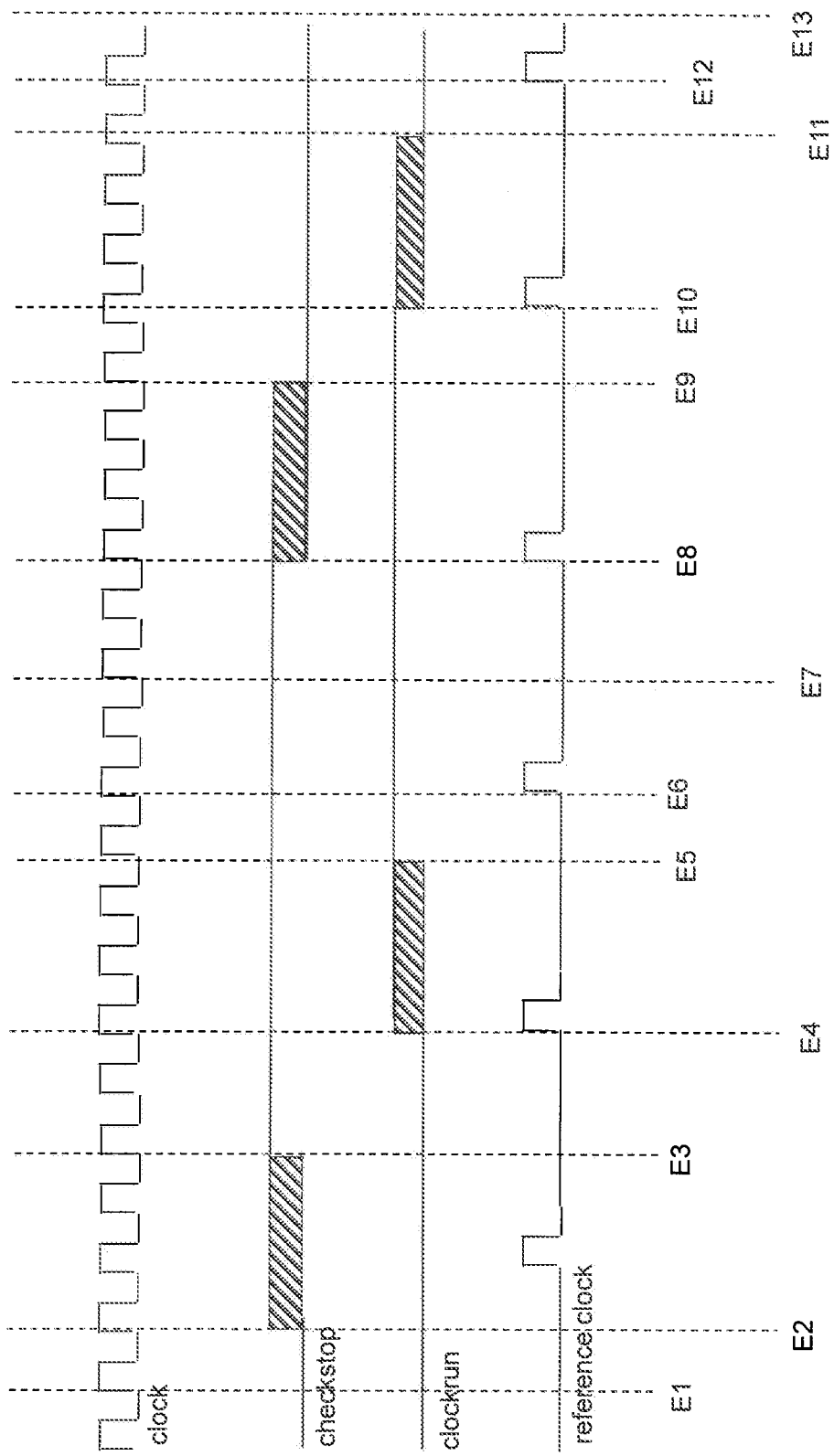
FIG. 3 is a timing diagram illustrating event propagation, in accordance with one or more aspects of the present invention.

FIG. 3 illustrates a sequence of events during clock stop and clock start actions. For visibility reasons, the fast clock used for the chip clock cycles is only four times as fast as the reference clock used for the synchronization. At time E1 a check stop situation occurs in one of the slave chips. At time E2 the slave chip sends the check stop request to the master chip as indicated by a rising edge of the checkstop net, which is received by the master chip at time E3. At time E4, synchronized with the reference clock, the master chip reacts to the received check stop request and sends a clock stop command to the slave chips as indicated by a rising edge of the clockrun net and starts its own clock control command propagation. The clock stop command is received by the slave chip at time E5. Synchronized with the reference clock, the slave chip reacts to the received clock stop command at time E6 by starting its clock control command propagation. At time E7 the master chip and the slave chips perform a synchronous clock stop.

At time E8 the slave chip drops its clock stop request, which is indicated by a falling edge of the clockstop net. This is received by the master chip at time E9. Synchronized with the reference clock, the master chip reacts to this received dropped clock stop request at time E10 and starts its own clock capturing action and sends a clock run command to the slave chips, which is indicated by a falling edge of the clockrun net. The clock start command is received by the slave chip at time E11. The slave chip reacts to the received clock start command at time E12 synchronized with the reference clock by starting its clock capturing action. At time E13 the master chip and the slave chips perform a synchronous clock start.

Figure 4:
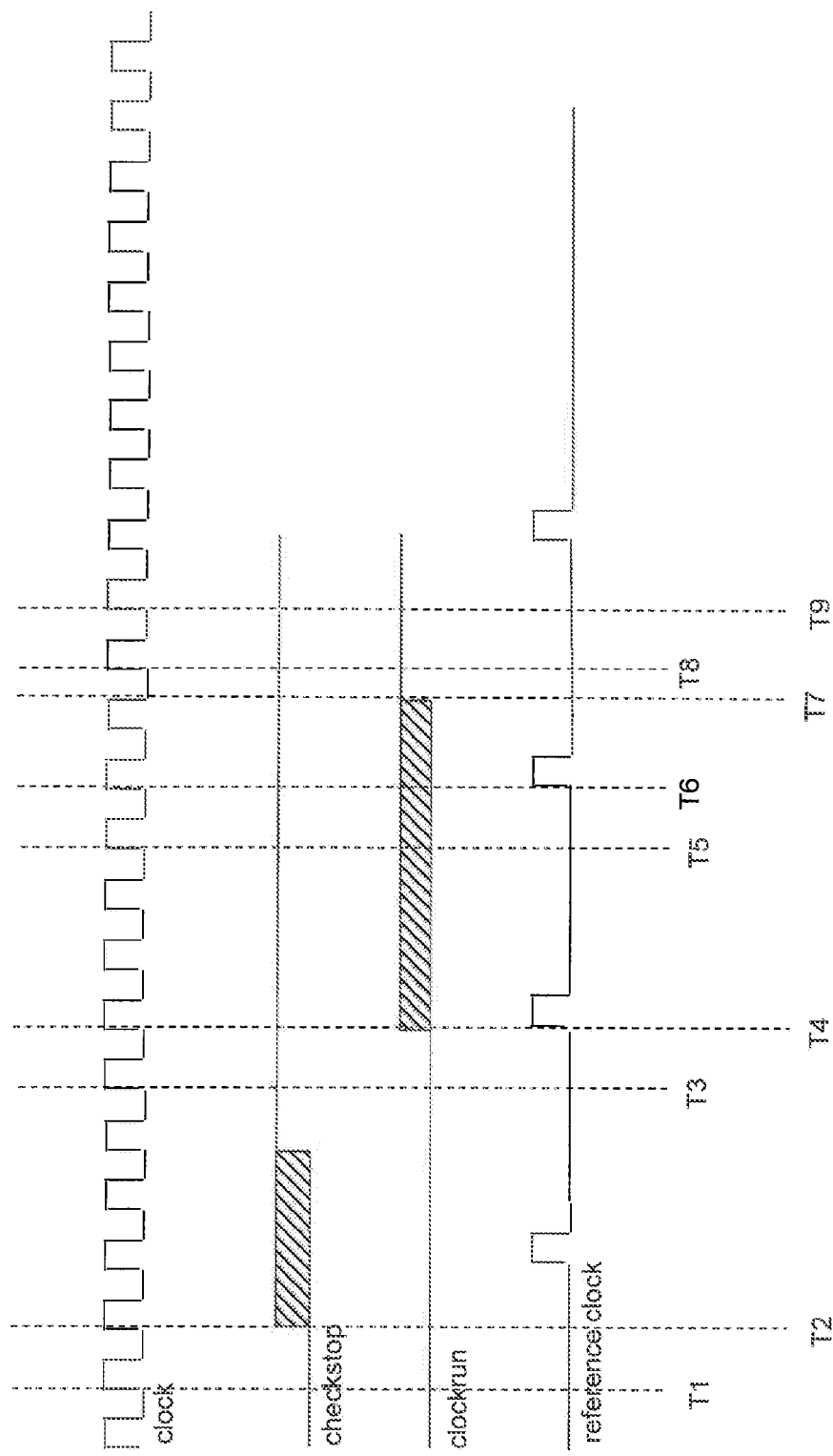
FIG. 4 is another timing diagram illustrating event propagation, in accordance with one or more aspects of the present invention.

If a wire delay is larger than the synchronization clock cycle then the logic of a chip can be configured into a "Late Mode" behaviour as shown exemplary in FIG. 4. As long as the time difference between the fastest delay and the slowest delay is smaller than the reference clock cycle, then the logic can be configured to tolerate extreme wire delays. At time T1 a check stop situation occurs in a slave chip. The slave chip will then send at time T2 the check stop request as indicated by a rising edge of the checkstop net. The master chip receives the check stop request at time T3. Synchronized with the reference clock, the master chip starts its clock capturing action at time T4 and sends the clock stop command to the slave chips, which is indicated by a rising edge of the clockrun net. At time T5 the first slave chip receives the clock stop command. Synchronized with the reference clock, the first slave chip starts its clock capturing action at time T6. The second slave chip, which is configured into a "Late Mode" behaviour, receives the clock stop command at time T7 and reacts unsynchronized with the reference clock to the clock stop command at time T8 by starting its clock capturing action. At time T9 a synchronous clock stop is performed by all chips.

Those skilled in the art will note from the above description, that the methods and computer systems disclosed herein have the following advantages:
- no central clock chip is needed;
- it offers tolerance to latency differences on the multi-drop nets;
- the use of multi-drop nets needs less wiring as point-to-point connections;
- only one additional input and output pin is needed per chip;
- a low frequency synchronization pulse that is already present in the computer system can be reused;
- a clock start and stop mechanism can be implemented using the same wire;
- the same control logic can be used on all chips as the master and slave status is configurable; and
- it supports synchronous restart of the computer system after synchronous clock stop and subsequent debug and repair actions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for synchronously stopping and starting units on chips in a node of a multi nodal computer system comprising a plurality of nodes, each of which includes chips of different types, wherein one of the chips is configured as a master chip, the master chip being connected to slave chips via at least two multi-drop nets, the at least two multi-drop nets comprising a checkstop net and a clockrun net, and wherein the master chip and the slave chips are connected to a reference clock, the method comprising:
   in response to a request received by the master chip from one of the chips to trigger events in the units, sending by the master chip a respective command to itself and to the connected slave chips at a next pulse of the reference clock following receiving of the request; and
   in response to the command being received at a receiving chip from the master chip, waiting by the receiving chip a defined number of clock cycles following the next pulse of the reference clock, and subsequently triggering a respective event in its units, depending on the received command.

2. The method of claim 1, wherein the trigger event is a clock stop or a clock start action.

3. The method of claim 1, wherein the reference clock is significantly slower than a clock frequency of the chips.

4. The method of claim 1, wherein the number of waiting clock cycles is configurable per chip.

5. The method of claim 1, wherein a slave chip is configured to stop or start its units unsynchronized with the reference clock.

6. The method of claim 1, further comprising delaying start of the units on a selected chip until a start condition is fulfilled.

7. A computer system comprising:
   a plurality of nodes, which includes chips of different types, wherein one of the chips is configured as a master chip, the master chip being connected to slave chips via at least two multi-drop nets, and wherein the master chip and the slave chips are connected to a reference clock;
   wherein the master chip comprises:
      a request receiving unit to receive requests from the chips of different types to trigger events in the units; and
      a command unit responsive to a received request and to a pulse from the reference clock to send a command according to the received request to the master chip and to the connected slave chips;
   and wherein each slave chip of the slave chips comprises:
      a command receiver to receive a command from the master chip and to synchronize with the reference clock;
      a delay unit to wait for a defined number of clock cycles; and
      a staging latch to trigger events in units on the slave chip.

8. The computer system of claim 7, wherein an event is a clock stop or clock start action.

9. The computer system of claim 7, wherein the reference clock is significantly slower than a clock frequency of the chips.

10. The computer system of claim 7, wherein the delay units are variable delay units with the number of waiting clock cycles being configurable.

11. The computer system of claim 7, wherein a slave chip is configured to stop or start its units, unsynchronized with the reference clock.

12. The computer system of claim 7, wherein each slave chip of the slave chips is configured to delay start of its units until a start condition is fulfilled.

* * * * *